United States Patent
Zrodnikov

(10) Patent No.: US 8,156,686 B1
(45) Date of Patent: Apr. 17, 2012

(54) BIOACTIVE TREATMENT OF BIOLOGICAL MATERIAL FROM A PLANT SOURCE

(76) Inventor: Volodymyr Zrodnikov, Chico, CA (US)

( * ) Notice: Subject to any disclaimer, the term of this patent is extended or adjusted under 35 U.S.C. 154(b) by 876 days.

(21) Appl. No.: 11/820,263

(22) Filed: Jun. 18, 2007

Related U.S. Application Data

(63) Continuation-in-part of application No. 11/699,598, filed on Jan. 29, 2007, now abandoned.

(60) Provisional application No. 60/763,142, filed on Jan. 30, 2006.

(51) Int. Cl.
*A01G 7/04* (2006.01)

(52) U.S. Cl. ........................... 47/58.1 SE; 47/1.3

(58) Field of Classification Search ............ 47/1.3, 47/58.1 SE
See application file for complete search history.

(56) References Cited

U.S. PATENT DOCUMENTS

| | | | | |
|---|---|---|---|---|
| 525,988 | A * | 9/1894 | Lemstrom | 47/1.3 |
| 2,012,180 | A * | 8/1935 | Beck | 47/61 |
| 3,499,437 | A * | 3/1970 | Balamuth | 601/2 |
| 3,940,885 | A | 3/1976 | Gray | |
| 4,188,751 | A | 2/1980 | Saruwatari | |
| 4,226,246 | A | 10/1980 | Fragnet | |
| 4,239,010 | A | 12/1980 | Ambum | |
| 4,291,125 | A * | 9/1981 | Greatbatch | 424/618 |
| 4,930,504 | A | 6/1990 | Diamantopoulos | |
| 5,060,414 | A | 10/1991 | Wayland | |
| 5,077,934 | A | 1/1992 | Liboff | |
| 5,281,315 | A | 1/1994 | Krapivina | |
| 5,464,456 | A * | 11/1995 | Kertz | 47/1.3 |
| 5,814,078 | A | 9/1998 | Zhou | |
| 5,819,467 | A | 10/1998 | Zucker | |
| 6,023,880 | A | 2/2000 | Levengood | |
| 6,539,664 | B2 | 4/2003 | Katsen | |
| 6,561,968 | B1 | 5/2003 | Dissing | |
| 6,902,521 | B2 | 6/2005 | Baugh | |
| 2010/0235949 | A1 | 9/2010 | Sluijter | |

FOREIGN PATENT DOCUMENTS

| | | |
|---|---|---|
| GB | 1540295 | 2/1979 |
| GB | 2100112 A * | 12/1982 |
| JP | 8103183 | 4/1996 |
| RU | 2083072 | 7/1997 |
| RU | 2158493 | 11/2000 |
| RU | 2185714 | 7/2002 |
| RU | 2187920 | 8/2002 |

OTHER PUBLICATIONS

The Nitrogen Cycle, Jul. 7, 2004.*

* cited by examiner

*Primary Examiner* — Kristen Hayes

(74) *Attorney, Agent, or Firm* — Marsh Fischmann & Breyfogle LLP

(57) ABSTRACT

A method for bioactive treatment of biological material from a plant source by exposure to one or more electromagnetic pulses are described. The biological material is in a target irradiation area. At least one electric pulse is generated. At least one electromagnetic pulse is then generated responsive to the at least one electric pulse. The at least one electromagnetic pulse generated to have parameters in common with that of natural lightning's electromagnetic pulses. The biological material is irradiated with the at least one electromagnetic pulse for bioactivation of the biological material for enhancement of the one or more growth characteristics thereof.

10 Claims, 2 Drawing Sheets

BIOACTIVE TREATMENT OF BIOLOGICAL MATERIAL FROM A PLANT SOURCE

CROSS-REFERENCES TO RELATED APPLICATIONS

The present application is related to and claims priority to U.S. patent application Ser. No. 11/699,598, filed Jan. 29, 2007, now abandoned, which claims priority from U.S. Provisional Patent Application No. 60/763,142, filed Jan. 30, 2006. The entire contents of U.S. Provisional Patent Application No. 60/763,142 are incorporated by reference in U.S. patent application Ser. No. 11/699,598, and the entire contents of both U.S. Provisional Patent Application No. 60/763,142 and U.S. patent application Ser. No. 11/699,598 are incorporated into the present application by reference for all purposes to the extent that such contents are not inconsistent with the content of the present application. Notably, even though it is not required by statute to provide any characterization such as "continuation" or "continuation-in-part," the U.S. Patent and Trademark Office's data entry requirements require such designation. Thus, for this limited purpose, the present application is designated as a continuation-in-part of U.S. patent application Ser. No. 11/699,598, subject to the understanding that such designation is not to be construed in any way as any type of commentary and/or admission as to whether or not the present application contains any new matter in addition to the contents of its parent application(s).

FIELD OF THE INVENTION

One or more aspects of the invention relate generally to bioactive treatment of biological material and, more particularly, to a bioactive treatment of biological material from a plant source by exposure to one or more electromagnetic pulses.

BACKGROUND OF THE INVENTION

It has been known for some time that application of an "artificial" electromagnetic field may produce some bioactive effects on seeds and plants. Notably, the term "artificial" as used herein is to distinguish a man-made electromagnetic field from that which may occur naturally. Such effects may manifest themselves in some respects by enhanced quality of seeds and plants. Furthermore, the electromagnetic treatment of seeds may result in increased crop yields when compared with non-treated seeds. There are many known methods and equipment for the electromagnetic treatment of seeds and plants disclosed, for example, in the following patents: U.S. Pat. Nos. 6,561,968 B1; 6,539,664 B2; 6,023,880; 5,819,467; 5,814,078; 5,281,315; 5,077,934; 4,930,504; 4,239,010; 4,226,246; 4,188,751; 3,940,885; RU Pat. No. 2,187,920; 2,185,714; 2,158,493; 2,083,072; GB Pat. No. 1,540,295; and JP Pat. No. 8,103,183.

However, there are practical limitations to current uses of an artificial electromagnetic field to enhance seed and plant growth. As is known, treatment with an artificial electromagnetic field may lead to undesirable genetic changes in seeds and plants. Such treatment may also give rise to harmful properties of agricultural products. While such harmful properties are difficult to predict, a bioactivation treatment more closely analogous to nature than conventional approaches may be less likely to have harmful side effects, whether foreseen or not. Notably, by bioactivation and bioactivate it is meant to cause, promote, or accelerate bioactivity or bioactivities.

Accordingly, it would be both desirable and useful to provide means that more closely mimics nature to bioactivate biological material, such as seeds, to at least reduce the likelihood of one or more of the above-mentioned limitations.

SUMMARY OF THE INVENTION

One or more aspects of the invention relate generally to bioactive treatment of biological material and, more particularly, to a bioactive treatment of biological material from a plant source by exposure to one or more electromagnetic pulses.

An aspect of the invention generally is a method for bioactive treatment to enhance one or more growth characteristics of biological material. The biological material is placed in a target irradiation area, or a current loop is placed in the target irradiation area having the biological material. A succession of electric pulses is generated. A succession of electromagnetic pulses is generated responsive to the electric pulses. The electromagnetic pulses are generated to have parameters in common with that of natural lightning's electromagnetic pulses. The biological material is irradiated with the electromagnetic pulses for bioactivation of the biological material for the enhancement of one or more growth characteristics thereof.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well-known features have not been described in detail so as not to obscure the invention. Although particular numerical examples are described herein for purposes of clarity by way of example, it should be understood that the scope of the description is not limited to these particular numerical examples as other values may be used.

Bioactive treatment of seeds and plants is described. Bioactive effects for seeds or plants, or both, may include increasing one or more of seed germination capacity, energy of germination, or rate of growth; seeds subject to such bioactive treatment may be capable of producing an increase in yield from approximately 3 to 30 percent when compared with non-treated seeds.

As described below in additional detail, seeds and plants are exposed to a succession of artificially produced electromagnetic pulses. These pulses have parameters in common with that of natural lightning's electromagnetic pulses. As described in additional detail below, such artificial electromagnetic pulses may be created using sawtooth-shaped electric current pulses passing through a current loop. The pulses may have a rise time in a range of approximately 0.001 to 0.03 ms, a time-to-half of pulse peak in a range of approximately 0.01 to 0.25 ms, and duration in a range of approximately 10 ms to 1 s. Optionally, in addition to using such pulses, seeds or plants, or both, may be exposed to a static electric field. This static electric field may have electrical field strength in a range of approximately 1500 to 3000 V/m, and may be applied before and after the application of each artificial time-variable electromagnetic pulse.

It should be understood that seeds may be exposed to an electromagnetic field generated by one or more time-variable electromagnetic pulses before the seeds are scattered, planted, or otherwise sown. Seeds may be exposed to time-variable electromagnetic field pulses before, during, and/or after the planting of the seeds. Thus, exposure of the seeds to such pulses may hasten seed germination, as well as accelerate plant growth after germination.

Figure 1:
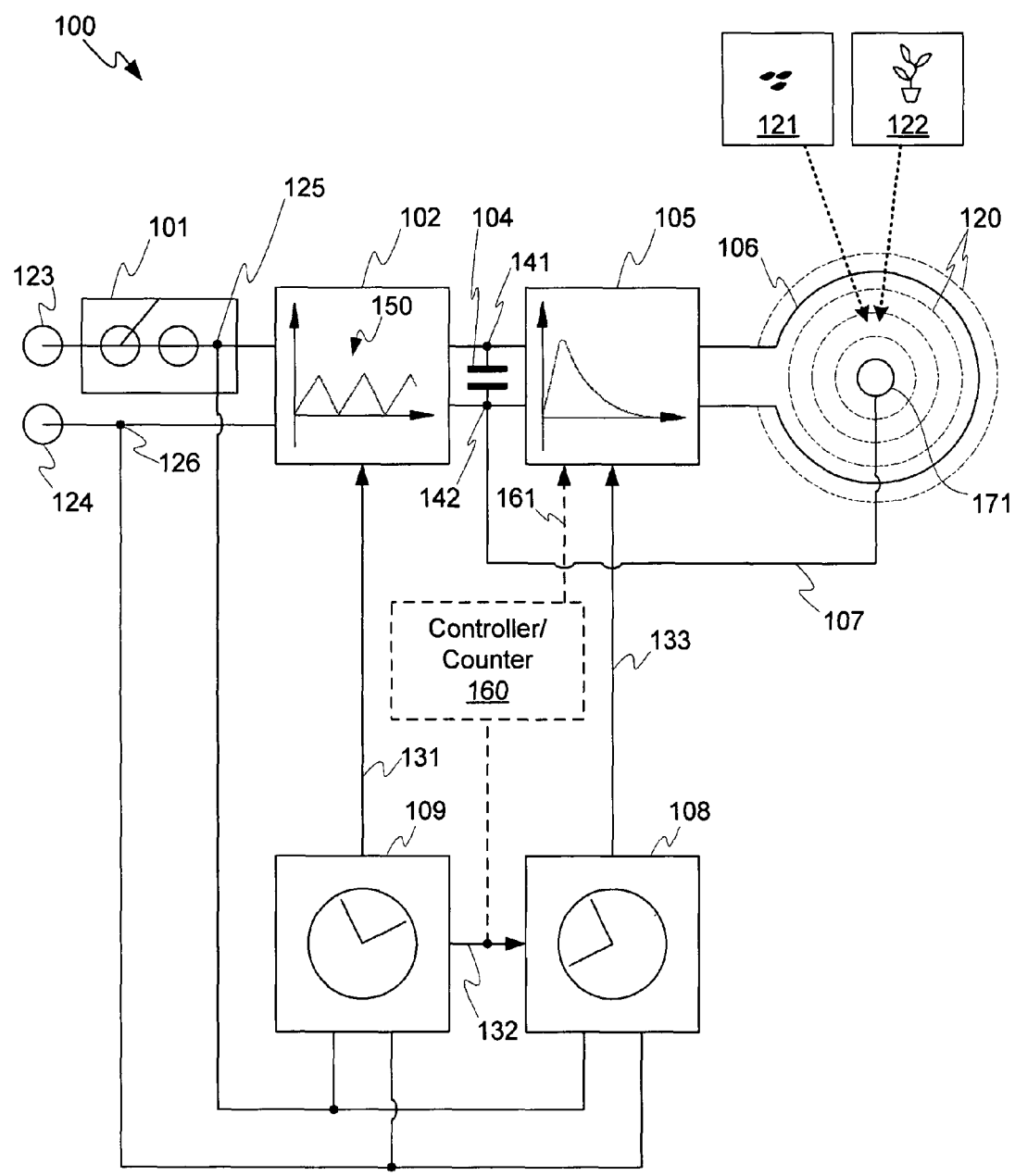
FIG. 1 is a block/flow diagram depicting an exemplary embodiment of an electromagnetic-pulse-generating machine that may be used for generating a time-variable electromagnetic field, or more particularly electromagnetic pulses.

FIG. 1 is a block/flow diagram depicting an exemplary embodiment of an electromagnetic pulse generating machine 100 that may be used for generating a time-variable electromagnetic field, or more particularly electromagnetic pulses 120. Seeds 121 or plants 122, or both, may be exposed to pulses 120 as at least part of a bioactive treatment. In this example embodiment, machine 100 includes an input electrical switch 101, a generator 102 of unipolar pulses ("unipolar pulse generator 102"), a discharge capacitor 104, an adjustable resistance-inductance ("RL") discharge circuit 105 with a current loop 106, a start-stop timer 109, and a cyclic timer 108.

RL discharge circuit 105 may include an electronic switch, a variable resistor ("R") and a variable inductance ("L") connected in series to each other and to current loop 106. Current loop 106 may, though need not, be predominantly circularly-shaped.

Notably, discharge circuit 105 is not shown in detail as it is well-known. An example of an RL discharge circuit that may be used is described, for example, in "Principles and Applications of Electrical Engineering," $2^{nd}$ Edition, by Giorgio Rizzoni (1996, Chicago: Irwin/Times Mirror).

From a power supply voltage node 123, switch 101 may be coupled in series with a supply voltage node 125. A ground 124 may be coupled in series with a ground node 126. Stop-start timer 109, cyclic timer 108, and unipolar pulse generator 102 may be coupled in parallel, namely with respect to nodes 125 and 126, for powering those circuits.

Figure 2:
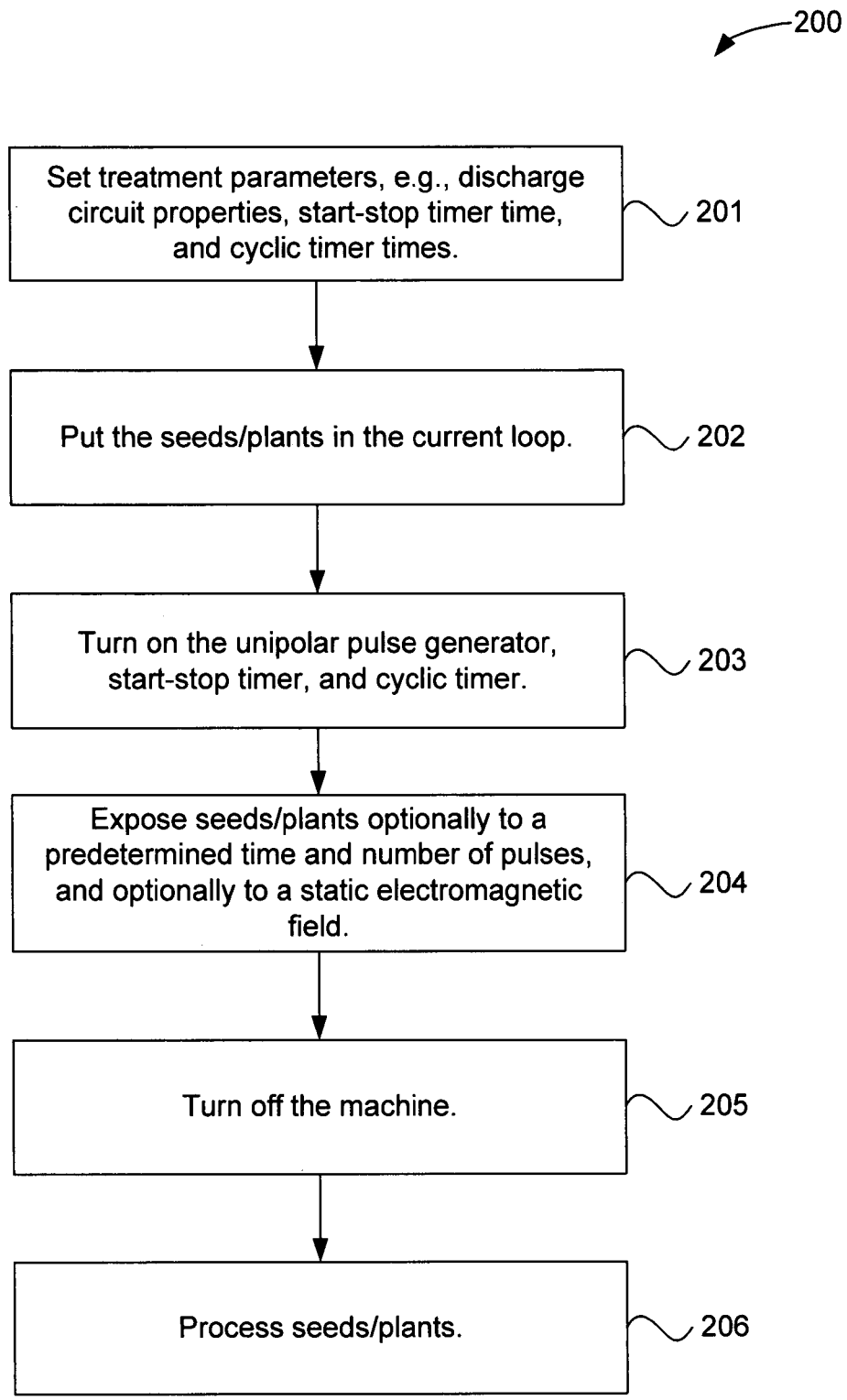
FIG. 2 is a flow diagram depicting an exemplary embodiment of a bioactive treatment flow.

FIG. 2 is a flow diagram depicting an exemplary embodiment of bioactive treatment flow 200. With renewed reference to machine 100 of FIG. 1 and ongoing reference to FIG. 2, bioactive treatment flow 200 as well as operation of machine 100 are further described.

Unipolar pulse generator 102 generates unipolar pulses as provided to a supply side node 141 and a negative or ground side node 142. Notably, for purposes of clarity and not limitation, these nodes 141 and 142 are referred to as a positive potential node and a zero potential node, respectively. Discharge capacitor 104 is coupled between nodes 141 and 142, and pulse input to RL discharge circuit 105 is sourced from nodes 141 and 142. Thus, unipolar pulses from unipolar pulse generator 102 are provided to charge capacitor 104. Notably, even though a return to zero voltage sawtooth-shaped waveform 150 is illustratively shown, it should be appreciated that other waveforms may be used, as well as modified versions of this example waveform 150. For example, a half sinusoid waveform may be used.

At 201, treatment parameters are set, such as discharge circuit resistance and inductance parameters, and start-stop timer and cyclic timer parameters for example. These parameters may be used to configure electromagnetic pulses to be generated by machine 100. Some pulse parameters for machine 100 include a rise time in a range of approximately 0.001 to 0.03 ms, a time-to-half of pulse peak in a range of approximately 0.01 to 0.25 ms, and duration in a range of approximately 10 ms to 1 s. These pulse parameters may be established by setting resistance and inductance of RL discharge circuit 105. Notably, these pulse parameters further depend on capacitance of discharge capacitor 104 and an inductance of current loop 106.

Duration of treatment, namely length of exposure of seeds 121 or plants 122 to pulses 120, may be established by setting start-stop timer 109. Start/stop output 131 starts and then stops pulse generation by unipolar pulse generator 102 according to a set interval. Start/stop output 132, which may be the same signal as start/stop output 131, is provided from start-stop timer 109 to cyclic timer 108 to start and stop operation thereof. Output 133 from cyclic timer 108 to discharge circuit 105 is used to adjust pulse repetition time during a treatment cycle. In other words, the rate at which pulses 120 are output from discharge circuit 105 via current loop 106 depends upon frequency of output signal 133. Notably, output signal 133 may be a train of pulses provided with some periodicity, a clock signal, an analog oscillating signal, or other signal form capable of causing discharge circuit 105 to repeatedly discharge a pulse to current loop 106.

For treatment, seeds 121 or plants 122, or both, may be placed inside current loop 106, or at least proximate to current loop 106, for effectively receiving electromagnetic stimulation from pulses 120 at 202. More particularly, seeds 121 or plants 122, or both, may be placed within a central region defined as a volume extending vertically within current loop 106, where current loop 106 is located above a surface upon which such seeds 121 or plants 122, or both, are placed. However, seeds 121 or plants 122 or both may be placed outside and proximate to current loop 106. Alternatively, or in addition, current loop 106, as well as receiving end 171 of electrode 107, may be placed in a target irradiation area including biological material to be irradiated.

At 203, unipolar pulse generator 102, start-stop timer 109, and cyclic timer 108 are turned on, which may be a simultaneous activation of all three components, by flipping switch 101 to an "on" or conducting position. Responsive to activation and receipt of a start signal from output 131, unipolar pulse generator 102 charges discharge capacitor 104; then, responsive to output 133 from cyclic timer 108, an electronic switch of RL discharge circuit 105 opens, and a current pulse, having parameters responsive in part to settings set at 201, is passed through to current loop 106.

Located at least proximate to the center of current loop 106 is an electromagnetic potential receiving end 171 of an electrode 107. Notably, this electromagnetic potential receiving end 171 of electrode 107 need not be centrally located within current loop 106, but is at least somewhere proximate, internally or externally, with respect to current loop 106 for the purposes of creating a static electric field between electrode 107 and current loop 106. The other end of electrode 107 is coupled to ground side node 142. The combination of electromagnetic pulses 120 irradiated by current loop 106 and static electric field between electrode 107, as described below in additional detail, and current loop 106 may be analogized to a source of electromagnetic energy discharging to the Earth in the form of a lightning strike and an associated increase in static electricity in the air.

At 204, current loop 106 irradiates electromagnetic pulses 120. The duration of each pulse and the number of pulses may be predetermined. For this example embodiment, electromagnetic pulses 120 are spatial sawtooth-shaped electromagnetic pulses generated using parameters set at 201. Thus, during a set time interval controlled using start-stop timer 109, seeds 121 or plants 122, or both, are exposed to pulses 120, where each pulse 120 is of a duration controlled using cyclic timer 108. Notably, the total number of pulses 120 to which seeds 121 or plants 122, or both, are exposed during a treatment interval may be controlled by setting the treatment interval responsive to pulse duration for a target number of pulses 120. Optionally, at 204 seeds or plants, or both may additionally be exposed to a static electric field, as described below in additional detail.

Alternatively, a controller/counter 160 may optionally be coupled to receive output 132 from start-stop timer 109. Controller/counter 160 may be set to a value at 201 from which to start counting down responsive to activation by output 132. More particularly, an output 161 from controller/counter 160 may be used to control how many pulses 120 discharge circuit 105 produces during a treatment interval.

If seeds 121 or plants 122, or both, are placed between current loop 106 and a receiving end 171 of electrode 107, then such seeds 121 or plants 122, or both, may optionally be exposed to a static electric field between current loop 106 and electrode 107 in addition to irradiation by one or more pulses 120. The static electric field, or more particularly "quasi-static" electric field to be more precise, arises between current loop 106 and electrode 107 when a charge voltage of the discharge capacitor 104 is above zero volts. The field strength is controlled by both the charge voltage of discharge capacitor 104 and the distance between current loop 106 and receiving end 171 of electrode 107. Controller/counter 160 may optionally be used to control discharge circuit 105 for application of such a static electric field, as well as field strength thereof. While not wishing to be bound by theory, it is believed that use of the static electric field may increase the bioactive effect for some seeds and plants. Notably, though not illustratively shown with dashed lines in FIG. 1 for purposes of clarity, it should be understood that electrode 107 is optional, as exposure to such a static electric field is optional.

At 205, for example after start-stop timer 109 has timed out, machine 100 may be turned off by putting switch 101 in an "off" position. At 206, exposed seeds 121 or plants 122, or both, may be processed. For example, seeds 121 or plants 122, or both, may be subject to further treatment with one or more additional pulses as described herein, lab analysis, or planted or otherwise sown, or any combination thereof.

It has been found by means of analysis of natural lightning parameters that lightning discharges originate a powerful natural bioactive process for the seeds and plants. Direct experiments in which seeds are exposed to artificial time-variable electromagnetic fields with parameters duplicating that of natural lightning have yielded results similar to those of such natural bioactive process. Common parameters of an electromagnetic field produced by natural lightning were applied as parameters for the artificial electromagnetic field for the above-described bioactive treatment of seeds and plants. The averages for parameters of electromagnetic pulses produced by natural lightning are well-known and described, for example, in Martin A. Uman, "The Lightning Discharge", published by Dover Publications, New York, 2001.

The exposure of seeds 121 or plants 122, or both, as described above have been performed with a succession of artificially produced electromagnetic pulses 120 having parameters in common with that of natural lightning's electromagnetic pulses, namely: rise time of a pulse 120 is in a range of approximately 0.001 ms to 0.030 ms, time-to-half of pulse peak of a pulse 120 is in a range of approximately 0.01 ms to 0.25 ms, and duration of a pulse 120 is in a range of approximately 10 ms to 1 s.

In addition to the above-described irradiation of seeds 121 or plants 122, or both, by pulses 120, exposure of seeds 121 or plants 122, or both, to a static electric field as described above may be used. Such a static electric field may have electric field strength in a range of approximately 1500 to 3000 V/m, and such static electric field may be applied before or after, or before and after, each irradiation by an artificial, time-variable, electromagnetic pulse or pulses 120.

In experiments conducted by the inventor hereof, treatment of seeds and plants by exposure to an artificial time-variable electromagnetic field pulses having parameters in common with that of a natural electromagnetic field produced by lightning has resulted in improvement of one or more "growth" characteristics of seeds and plants. Additionally, exposure of such treated seeds and plants in some instances has included exposure to a static electric field. Results from such experiments has confirmed the improvement of one or more "growth" characteristics of seeds and plants, such as in germination capacity, energy of germination, and rate of growth generally in a range of approximately 3 to 30 percent for at least one of these three categories. These experiments have been used to confirm the repeatability and stability of these effects caused by bioactivation. Notably, with respect to seeds, the more dramatic improvements have been observed with seeds that are older, damaged, or otherwise not as robust as other seeds.

Accordingly, quality of seeds and plants may be increased. Additionally, while not be wishing to be bound by theory, it is believed that the likelihood of potential harmful effects of conventional electromagnetic treatment may be reduced or avoided by exposing seeds or plants, or both, to an artificial electromagnetic field having parameters in common with a natural electromagnetic field produced by lightning as described herein.

While the foregoing describes exemplary embodiment(s) in accordance with one or more aspects of the invention, other and further embodiment(s) in accordance with the invention may be devised without departing from the scope thereof, which is determined by the claim(s) that follow and equivalents thereof. For example, even though seeds and plants have been described as targets for pulsing with electromagnetic pulses having parameters in common with lightning, it should be appreciated that other biological material from a plant source may be used. For example, plant cuttings, plant tissue cultures, and the like may be used. Furthermore, though the above description has been generally in terms of irradiation by a succession of generated pulses, irradiation may be performed by exposure of biological material to a single pulse or a staging of application of individual pulses. Furthermore, seeds may be irradiated by pulses as described herein before, during, and/or after their planting. This may or may not include exposure to a static electric field before, during, and/ or after the planting.

What is claimed is:
1. A method for bioactive treatment to enhance one or more growth characteristics of biological material, the method comprising:
having the biological material in a target irradiation area;
generating at least one electric pulse;
generating at least one electromagnetic pulse responsive to the at least one electric pulse, wherein the at least one electromagnetic pulse has parameters that substantially duplicate parameters of natural lightning's electromag- netic pulses, with the parameters of the at least one electromagnetic pulse comprising:

a rise time between 0.001 ms and 0.030 ms, a time-to-half of pulse peak between 0.01 ms and 0.25 ms, and a pulse duration between 10 ms and 1 s; and irradiating the biological material in the target irradiation area with the at least one electromagnetic pulse for bio-activation of the biological material for enhancement of the one or more growth characteristics thereof.

2. The method recited in claim 1 wherein the at least one electric pulse comprises a sawtooth-shaped pulse.

3. The method recited in claim 1 wherein the at least one electric pulse comprises a unipolar pulse.

4. The method recited in claim 1 further comprising exposing the biological material to a static electric field.

5. The method recited in claim 4 wherein the static electric field comprises an electric field strength between 1500 V/m and 3000 V/m.

6. The method recited in claim 1 wherein the biological material comprises plant material.

7. The method recited in claim 1 wherein the biological material comprises a plant seed.

8. The method recited in claim 7 wherein irradiating the biological material comprises irradiating the plant seed prior to germination of the plant seed.

9. The method recited in claim 7 wherein irradiating the biological material comprises irradiating the plant seed during germination of the plant seed.

10. The method recited in claim 7 wherein irradiating the biological material comprises irradiating the plant seed after germination of the plant seed.

* * * * *